US009150798B2

(12) United States Patent
Ishii

(10) Patent No.: US 9,150,798 B2
(45) Date of Patent: Oct. 6, 2015

(54) METHOD AND DEVICE FOR REFORMING PRODUCED GAS

(75) Inventor: Toru Ishii, Saitama (JP)

(73) Assignee: IHI CORPORATION (JP)

( * ) Notice: Subject to any disclaimer, the term of this patent is extended or adjusted under 35 U.S.C. 154(b) by 325 days.

(21) Appl. No.: 13/991,659

(22) PCT Filed: Nov. 25, 2011

(86) PCT No.: PCT/JP2011/077190
§ 371 (c)(1),
(2), (4) Date: Jun. 5, 2013

(87) PCT Pub. No.: WO2012/086363
PCT Pub. Date: Jun. 28, 2012

(65) Prior Publication Data
US 2013/0247464 A1 Sep. 26, 2013

(30) Foreign Application Priority Data
Dec. 24, 2010 (JP) ................................. 2010-287618

(51) Int. Cl.
C10J 3/84 (2006.01)
C10J 3/64 (2006.01)
C10J 1/26 (2006.01)
(Continued)

(52) U.S. Cl.
CPC ... *C10J 1/26* (2013.01); *C01B 3/42* (2013.01); *C01B 3/56* (2013.01); *C10K 1/005* (2013.01); *C10K 1/20* (2013.01); *C10K 1/26* (2013.01); *C10K 3/005* (2013.01); *C10K 3/023* (2013.01); *C01B 2203/0233* (2013.01); *C01B 2203/0283* (2013.01); *C01B 2203/048* (2013.01); *C01B 2203/0425* (2013.01); *C01B 2203/0435* (2013.01); *C01B 2203/0475* (2013.01); *C01B 2203/0838* (2013.01); *C01B 2203/1252* (2013.01)

(58) Field of Classification Search
CPC combination set(s) only.
See application file for complete search history.

(56) References Cited

U.S. PATENT DOCUMENTS

2004/0237404 A1* 12/2004 Andrus et al. .................. 48/101
2009/0263316 A1* 10/2009 Iyer et al. .................... 423/658.3
2011/0286902 A1* 11/2011 Fan et al. ...................... 423/230

FOREIGN PATENT DOCUMENTS

JP 63-241098 10/1988
JP 2006-213817 8/2006
(Continued)

OTHER PUBLICATIONS

International Search Report and Written Opinion mailed Feb. 7, 2012 in corresponding PCT International Application No. PCT/JP2011/077190.
(Continued)

Primary Examiner — Kaity Handal
(74) Attorney, Agent, or Firm — Ostrolenk Faber LLP

(57) ABSTRACT

Provided is a method of reforming a produced gas to reform tar contained in the produced gas from a gasification furnace. Quick lime comes in contact with a produced gas (3) from a gasification furnace (2) in a reformer (1) such that the quick lime absorbs carbon dioxide in the produced gas to generate calcium carbonate, and reforming reaction of the tar is performed with calcium as a catalyst using heat of reaction emitted during that time. In addition, as the calcium carbonate of the reformer (1) is supplied and burnt in a reforming agent regenerator (8), the quick lime is regenerated and supplied into the reformer (1) again. According to the above configuration, it is possible to provide a method and device for reforming a produced gas that are capable of simplifying equipment and operation thereof.

15 Claims, 2 Drawing Sheets

(51) Int. Cl.
*C01B 3/56* (2006.01)
*C10K 1/20* (2006.01)
*C10K 1/26* (2006.01)
*C10K 3/00* (2006.01)
*C10K 3/02* (2006.01)
*C10K 1/00* (2006.01)
*C01B 3/42* (2006.01)

(56) References Cited

FOREIGN PATENT DOCUMENTS

| | | |
|---|---|---|
| JP | 2007-016061 | 1/2007 |
| JP | 2009-138186 | 6/2009 |
| JP | 2009-215387 | 9/2009 |
| JP | 2011-510115 | 3/2011 |
| WO | WO 2009/091325 | 7/2009 |
| WO | WO 2010/048376 A1 | 4/2010 |
| WO | WO 2010045232 | 4/2010 |

OTHER PUBLICATIONS

German Office Action dated Aug. 11, 2014 (12 pages).

Chinese Office Action, dated Aug. 21, 2014, issued in corresponding Chinese Patent Application No. 201180061147.6, filing date Nov. 25, 2011. English translation. Total 16 Pages.

* cited by examiner

METHOD AND DEVICE FOR REFORMING PRODUCED GAS

CROSS-REFERENCE TO RELATED APPLICATIONS

The present application is a 35 U.S.C. §§371 national phase conversion of PCT/JP2011/077190, filed Nov. 25, 2011, which claims priority to Japanese Patent Application No. 2010-287618, filed Dec. 24, 2010, the contents of which are incorporated herein by reference. The PCT International Application was published in the Japanese language.

TECHNICAL FIELD

The present invention relates to a method and device for reforming a produced gas that are capable of reducing tar generated by low temperature gasification by using additional relatively-small equipment.

BACKGROUND ART

Coal and other solid organic fuels are gasified to obtain a high calorific fuel gas used as a fuel gas or a source gas. Conventional gasification of coal or the like is performed at a high temperature of about 1273 K (1000° C.) or more, and in order to maintain the high temperature, combustion of some of the fuel such as coal is needed by supplying air or the like to combust some of the fuel such as coal or the like. As a result, a calorific value per unit volume of a produced gas may be decreased by mixing an exhaust gas due to the combustion therewith.

At the same time, since fuel conversion efficiency from the fuel to the produced gas is decreased, necessary fuel per calorific value of the gasified gas is increased, and operating cost needed for the gasification is increased. In addition, in recent times, while gasification using high purity oxygen instead of air has been performed in order to maximally increase the calorific value of the produced gas, in this method, since equipment for manufacturing oxygen is needed, equipment cost and operating cost are further increased.

Development of a technique of performing gasification at a low temperature is performed as a method of solving these problems. When the gasification is performed at the low temperature, consumption of air or oxygen can be reduced, and an increase in calorific value of the produced gas and a corresponding increase in fuel conversion efficiency are expected.

However, when the gasification is performed at the low temperature, a large amount of tar is generated in the produced gas, and the conversion efficiency of the fuel into the produced gas is decreased by the content of the tar. In addition, when the produced gas is used as a raw material for chemosynthesis, the tar should be removed.

A method of cleaning the produced gas with water and other solvents is generally employed in the related art as a method of removing the tar in the produced gas.

However, in the method of cleaning the gas with a solvent such as water, a large amount of drainage or waste liquid is generated, and the drainage or waste liquid should be processed. In addition, while the tar has a calorific value and can be used as fuel, it is difficult to recover the tar from the cleaned waste liquid, and accordingly, utilization efficiency of the fuel is decreased by the content of the tar.

In order to solve the problems, reforming the produced gas after the low temperature gasification at a high temperature and further decomposing the tar into CO, $H_2$ or the like to use them has been considered (see Patent Document 1 or the like).

In addition, a gasification device in which, as a chemical such as limestone ($CaCO_3$) is supplied into a combustion furnace filled with a bed material and an oxidant (air) is supplied to combust char supplied from a gasification furnace, heating of the bed material and burning (activation) of the chemical are performed, and as the bed material and the active chemical of the high temperature are supplied into a gas purifying furnace, the tar of the produced gas introduced into the gas purifying furnace from the gasification furnace is reformed by an catalytic action of the active chemical, is disclosed (see Patent Document 2 or the like).

CITATION LIST

Patent Documents

Patent Document 1: Japanese Unexamined Patent Application, First Publication No. 2009-215387
Patent Document 2: Japanese Unexamined Patent Application, First Publication No. 2007-16061

SUMMARY OF INVENTION

Technical Problem

However, as described in Patent Document 1, since the reforming reaction should be performed at a high temperature (a temperature higher than 1273 K=1000° C.), some of the fuel is still combusted to obtain necessary heat. While the low temperature gasification is performed to produce a high calorie gas that can be used for a chemical raw material or the like in many cases, as described above, the calorific value of the produced gas is reduced when the reforming temperature is maintained by combusting some of the fuel. In addition, when air is used as a gas for combusting some of the fuel, the produced gas is diluted by nitrogen contained in the air to noticeably reduce the calorific value. Meanwhile, when the decrease in calorific value is suppressed by combustion using the pure oxygen, an oxygen manufacturing device and energy for operating the device are needed.

In addition, when a reformer is configured to be used at a high temperature of more than 1273 K (1000° C.), consideration of a material and a structure of the reformer, and fusion/adhesion of ash content due to the produced gas are needed, and problems regarding safety or cost occur.

Further, in Patent Document 2, as the char is combusted in the combustion furnace to perform heating of the bed material and burning (activation) of the chemical, and the bed material and the chemical of the high temperature are circulated in the gas purifying furnace to control a temperature in the gas purifying furnace at a temperature needed for gas purification of 1073 K (800° C.) or more, reformation of the tar of the gasified gas from the gasification furnace is performed, and the gasification is performed by circulating, in the gasification furnace, the bed material and the chemical having a temperature decreased in the gas purifying furnace. For this reason, equipment becomes large and manipulation thereof becomes relatively complex.

In addition, as another problem of Patent Document 2, since the catalyst for reformation is circulated with the large amount of fluidizing medium for transferring the heat and the ash content contained in the coal, the concentration of catalyst particles in the fluidized bed formed in the gas purifying furnace is also self-limiting. Accordingly, the contact time of molecules of the tar with the catalyst particles is limited, and the decomposition efficiency of the tar should be restricted. Meanwhile, in order to increase the contact time, when a fluidized bed capacity in the gas purifying furnace is increased, not only is the gas purifying furnace itself increased in size but a structure for supporting the weight of the increased fluidizing medium is increased in size.

In addition, in Patent Document 2, since the catalyst for the reformation and the ash content contained in the coal are mixed, alkaline component (mainly, calcium), which is a main component of the catalyst, and an acidic component (silica or alumina) in the coal ash may be reacted to decrease the catalytic effect.

In consideration of the problems in the related art, the present invention provides a method and device for reforming a produced gas that are capable of reducing tar generated by low temperature gasification by using additional relatively-small equipment.

Solution to Problem

The present invention relates to a method of reforming a produced gas configured to reform tar contained in the produced gas from a gasification furnace. In the method, calcium carbonate is generated in a reformer by bringing the produced gas from the gasification furnace in contact with quick lime so that the quick lime absorbs carbon dioxide in the produced gas, and a reforming reaction of the tar is performed with calcium as a catalyst using heat generated when the calcium carbonate is generated. In addition, the calcium carbonate in the reformation device, auxiliary fuel, and air are supplied into a reforming agent regenerator to form a fluidized bed, the calcium carbonate is burnt using heat by combustion of the auxiliary fuel to return the calcium carbonate to the quick lime, and the quick lime is supplied into the reformer.

In the method of reforming the produced gas, in the reformer, the reforming reaction of the tar may be performed using, in addition to the heat generated when the calcium carbonate is generated from the quick lime, heat generated when the carbon dioxide is generated through reaction between carbon monoxide and moisture in the produced gas.

In addition, in the method of reforming the produced gas, steam may be reacted with the quick lime burnt by the reforming agent regenerator to obtain slaked lime having high activity, and the quick lime may be obtained by heating and dehydrating the slaked lime and supplied into the reformer.

Further, in the method of reforming the produced gas, steam may be reacted with a part of the quick lime burnt by the reforming agent regenerator to obtain the slaked lime having high activity, and the slaked lime may be supplied into the reformer together with the quick lime burnt by the reforming agent regenerator.

Furthermore, in the method of reforming the produced gas, oxygen may be supplied, instead of air, into the reforming agent regenerator, a gas containing high concentration carbon dioxide may be generated in the reforming agent regenerator by burning the calcium carbonate with the oxygen, and the carbon dioxide may be recovered from the generated gas.

In this case, a part of a regenerated off-gas from the reforming agent regenerator may be mixed with the oxygen supplied into the reforming agent regenerator. Further, a part of the regenerated off-gas from the reforming agent regenerator and the steam may be mixed with the oxygen supplied into the reforming agent regenerator. In the case of the latter, the regenerated off-gas from the reforming agent regenerator may be cooled to the condensation temperature of the steam or less.

In addition, in the method of reforming the produced gas, the reformer may introduce and reform the produced gas from a 2-tower type gasification furnace operated at a normal pressure.

Further, the present invention relates to a device for reforming a produced gas configured to reform tar contained in the produced gas from a gasification furnace. The device includes: a reformer configured to generate calcium carbonate by introducing the produced gas from the gasification furnace into the reformer and bringing the produced gas in contact with quick lime so that the quick lime absorbs carbon dioxide in the produced gas, and perform a reforming reaction of the tar with calcium as a catalyst using reaction heat generated when the calcium carbonate is generated; and a reforming agent regenerator configured to introduce the calcium carbonate in the reformer, auxiliary fuel, and air to form a fluidized bed, return the calcium carbonate to the quick lime by burning the calcium carbonate using heat by combustion of the auxiliary fuel, and supply the quick lime into the reformer again.

The device for reforming the produced gas may have a reforming agent activation device configured to introduce the quick lime burnt by the reforming agent regenerator, obtain slaked lime having high activity by reaction of steam with the quick lime, and continuously, obtain the quick lime obtained by heating and dehydrating the slaked lime, and supply the quick lime to the reformer.

In addition, the device for reforming the produced gas may have a reforming agent activation device configured to allow steam to react with a part of the quick lime burnt by the reforming agent regenerator to obtain the slaked lime having high activity, and supply the slaked lime into the reformer together with the quick lime burnt by the reforming agent regenerator.

Further, the device for reforming the produced gas may have an oxygen supply device configured to supply oxygen, instead of air, into the reforming agent regenerator, auxiliary fuel may be combusted with the oxygen, and the carbon dioxide may recovered from a produced gas containing high concentration carbon dioxide which is obtained by burning calcium carbonate using heat by combustion of the with the auxiliary fuel.

In this case, a part of a regenerated off-gas from the reforming agent regenerator may be mixed with the oxygen supplied into the reforming agent regenerator. Further, a part of the regenerated off-gas and the steam from the reforming agent regenerator may be mixed with the oxygen supplied into the reforming agent regenerator. In the case of the latter, the regenerated off-gas from the reforming agent regenerator may be cooled to the condensation temperature of the steam or less.

In addition, in the device for reforming the produced gas, the reformer may be connected to a 2-tower type gasification furnace operated at a normal pressure.

Advantageous Effects of Invention

According to the method and device for reforming a produced gas, since the reforming reaction of the tar is performed with calcium as a catalyst using heat generated when the quick lime absorbs the carbon dioxide in the produced gas to generate calcium carbonate in the reformer, the reformation of the produced gas can be performed at a lower temperature than in the conventional reformation device. Accordingly, a reduction of calorific value of the produced gas can be suppressed by reducing supply of the oxygen or the like to increase the temperature or by suppressing consumption of the produced gas without supply of the oxygen or the like.

In addition, the reduction of calorific value of the produced gas can also be suppressed by decomposing the tar into a gas containing CO and $H_2$ as main components.

Further, the quick lime is regenerated by supplying the calcium carbonate in the reformer into the reforming agent regenerator and burning the calcium carbonate, and the regenerated quick lime is supplied into the reformer again to perform the reformation of the tar. Accordingly, the continuous reformation operation can be stably performed.

Furthermore, while the quick lime obtained by repeating the burning in the reforming agent regenerator has a densified crystalline structure and decreased activity, the steam is reacted with the quick lime to loosen the dense structure to return the quick lime to the slaked lime having recovered activity, and the slaked lime is supplied into the reformer. Accordingly, stable reformation can be performed.

DESCRIPTION OF EMBODIMENTS

Hereinafter, an example showing an embodiment of the present invention will be described.

Figure 1:
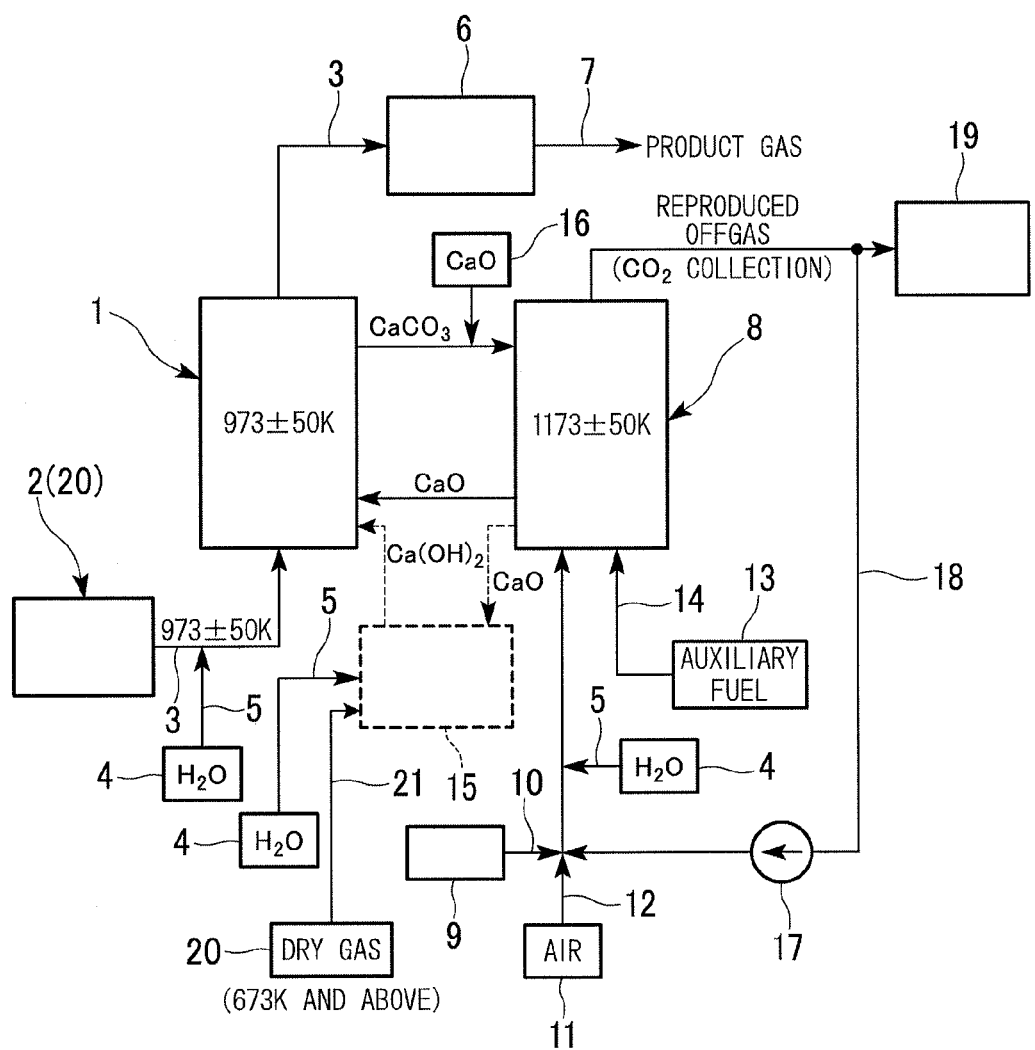
FIG. 1 is a block diagram showing an example of a device for reforming a produced gas of the present invention.

FIG. 1 is a block diagram showing an example of a device for reforming a produced gas of the present invention. In FIG. 1, reference numeral 1 designates a reformer. A produced gas 3 generated in a gasification furnace 2 is introduced in the reformer 1, and the reformer 1 reforms tar contained in the produced gas 3. Since $H_2$, CO, $CO_2$, $H_2O$, tar (H, C), and so on are mixed in the produced gas from the gasification furnace 2, when gasification is performed at a low temperature in the gasification furnace 2, the amount of tar contained in the produced gas 3 is increased.

Quick lime (CaO) is supplied into the reformer 1 as a reforming agent (catalyst) for assisting reformation of the tar. In addition, as the produced gas 3 from the gasification furnace 2 is introduced from a lower side of the reformer 1, a fluidized bed is formed to bring the quick lime in contact with the produced gas 3. Accordingly, the quick lime absorbs carbon dioxide ($CO_2$) in the produced gas to generate calcium carbonate ($CaCO_3$) (exothermic reaction), and a temperature of 873 to 1073 K (600 to 800° C.) is maintained by heat of reaction at that time to perform reforming reaction of the tar using calcium in the quick lime as a catalyst. When a 2-tower type gasification furnace 20 is used as the gasification furnace 2, in the 2-tower type gasification furnace 20, the gasification can be performed at a normal pressure, and the temperature of the produced gas 3 derived from the 2-tower type gasification furnace 20 is about 973±50 K. While a peak value of the produced gas of 2-tower type gasification is 1023 K (973 K+50 K=1023 K) and an upper limit of the temperature in the 2-tower type gasification furnace 20 is 1073 K, since +50 K is within a range that can be sufficiently obtained in the reaction in which the quick lime absorbs the carbon dioxide, it is possible to appropriately perform the reformation.

In addition, since the heat of reaction is generated even when carbon monoxide (CO) and steam ($H_2O$) in the produced gas 3 are reacted to generate carbon dioxide ($CO_2$), this heat of reaction can also be used for the reforming reaction of the tar. Here, when moisture in the produced gas 3 is insufficient, steam 5 from a steam source 4 may be added to the produced gas 3.

After dust or the like is moved by a dust collector 6, the produced gas 3 in which the tar is modified by the reformer 1 is extracted as a product gas 7.

Since the quick lime may be changed into calcium carbonate through the reformation process in the reformer 1 and some of the carbon content in the tar may be adhered to a surface of the reforming agent as solid carbon by the decomposition of the tar, regeneration of the reforming agent is needed to perform continuous reformation of the produced gas 3. For this reason, a reforming agent regenerator 8 configured to perform regeneration in which calcium carbonate is returned to the quick lime by introducing the calcium carbonate from the reformer 1 into the reforming agent regenerator 8 and burning the calcium carbonate, and supply the regenerated quick lime to the reformer 1 again is provided.

Calcium carbonate from the reformer 1 is introduced into the reforming agent regenerator 8. In addition, as air 12 from an air supply device 11 is introduced from a lower portion of the reforming agent regenerator 8 to form the fluidized bed and an auxiliary fuel 14 from an auxiliary fuel supply device 13 is supplied to the reforming agent regenerator 8 to maintain a temperature in the reforming agent regenerator 8 of 1173±50 K, calcium carbonate is burnt to be regenerated as quick lime. Then, the regenerated quick lime is returned to the reformer 1. Here, since the fluidized bed is formed in the reformer 1 and the reforming agent regenerator 8, delivery of the calcium carbonate and the quick lime between the reformer 1 and the reforming agent regenerator 8 using an overflow type can be smoothly performed.

When the regeneration is performed by supplying the air 12 into the reforming agent regenerator 8 and combusting the auxiliary fuel 14, carbon dioxide ($CO_2$) discharged by the burning of the calcium carbonate is diluted by nitrogen in the air and extracted as a regenerated off-gas containing the carbon dioxide ($CO_2$) of low concentration. However, in recent times, in consideration of reduction in discharge of carbon dioxide, for which necessity is increasing, the regeneration of the reforming agent may be performed using an oxygen combustion technique.

That is, a pathway configured to supply oxygen 10 from an oxygen manufacturing device 9 is formed, a regenerated off-gas circulation pathway 18 configured to extract some of a regenerated off-gas of the reforming agent regenerator 8 by a blower 17 is added, and the auxiliary fuel 14 is combusted by a gas in which an oxygen concentration is adjusted by the oxygen 10 from the oxygen manufacturing device 9 and the regenerated off-gas from the regenerated off-gas circulation pathway 18, thereby performing the regeneration of the calcium carbonate. As a result, since the regenerated off-gas discharged by the burning of the calcium carbonate contains carbon dioxide of high concentration, the carbon dioxide can be easily recovered by a carbon dioxide recovery device 19.

However, when the regeneration of the reforming agent is performed by applying the oxygen combustion technique, the regeneration of the reforming agent is performed under a high concentration carbon dioxide atmosphere. It has been confirmed that the regeneration reaction of the reforming agent, specifically, the reaction of burning and regenerating the calcium carbonate into the quick lime, is inhibited by the carbon dioxide in the atmospheric gas, and in particular, at the carbon dioxide concentration of about 100%, the regeneration cannot proceed due to a strong inhibitory effect when the burning temperature does not further increase. It has been known that the increase in burning temperature is disadvantageous in energy as described above, the compactness of the crystal of the quick lime generated by the burning is increased, and carbon dioxide absorption performance is noticeably decreased.

In order to solve the problem of the reforming agent regeneration under the high concentration carbon dioxide atmosphere, suppression of the carbon dioxide concentration to a certain level or less is effective, but when the carbon dioxide concentration is suppressed to a low level, recovery of the carbon dioxide becomes difficult. As a method of decreasing the carbon dioxide concentration in the reforming agent regenerator and realizing the carbon dioxide recovery, dilution by steam is effective. In the example of FIG. 1, in addition to the oxygen 10 supplied from the oxygen manufacturing device 9 and re-circulated and regenerated off-gas from the regenerated off-gas circulation pathway 18, the steam 5 supplied from the steam source 4 is mixed therewith, and supplied into the reforming agent regenerator 8. Here, as the carbon dioxide concentration in the gas supplied into the reforming agent regenerator 8 is controlled by controlling the amount of the steam 5, the regeneration of the reforming agent can be realized at a temperature of 1173±50 K.

Meanwhile, while the carbon dioxide concentration of the regenerated off-gas is decreased by supply of the steam 5, since the main components of the regenerated off-gas are the carbon dioxide and the steam, the steam is removed by merely cooling the regenerated off-gas to a condensation temperature of the steam or less. As a result, the concentration of the carbon dioxide can be increased to a high level, and it is thereby possible to make the gas to have a composition in which the carbon dioxide can be easily recovered. A substantial amount of carbon dioxide generated in the reforming agent regenerator 8 may be branched and supplied into the carbon dioxide recovery device 19, and the most part of the regenerated off-gas is re-circulated to the reforming agent regenerator 8. Here, since the most of the steam 5 supplied into an inlet of the reforming agent regenerator 8 is re-circulated together with the regenerated off-gas, the amount of steam supplied into the inlet of the reforming agent regenerator 8 may be set such that the sum of the amount of steam supplied into the inlet of the reforming agent regenerator 8 and the amount of steam contained in the re-circulated off-gas satisfies the amount needed for control of the carbon dioxide concentration.

A crystalline structure of the quick lime obtained by repeating the burning in the reforming agent regenerator 8 is densified to reduce the activity thereof. For this reason, a reforming agent activation device 15 configured to introduce the quick lime burnt by the reforming agent regenerator 8 and supply the steam 5 from the steam source 4 is provided. In this case, in the reforming agent activation device 15, the steam 5 is reacted with the densified quick lime to change the quick lime into slaked lime ($Ca(OH)_2$) in which the crystalline structure of the quick lime is loosened and the activity is increased, and the slaked lime is supplied to the reformer 1. In the reforming agent activation device 15, the activation can be continuously performed by extracting some of the quick lime burnt by the reforming agent regenerator 8 and the slaked lime can be supplied to the reformer 1. Here, the quick lime directly supplied from the reforming agent regenerator 8 and the slaked lime supplied from the reforming agent activation device 15 are mixed and supplied into the reformer 1 as a reforming agent. While both of the quick lime and the slaked lime can absorb the carbon dioxide, a calorific value generated when absorbing the carbon dioxide is larger in the quick lime. Accordingly, it is considered that when a ratio of the slaked lime in the reforming agent supplied into the reformer 1 is increased, the calorific value generated when the reforming agent absorbs $CO_2$ is reduced, and the temperature condition of the reformer 1 may not be maintained.

It will be appreciated that, when the absorption and the regeneration of the carbon dioxide are repeated, while the carbon dioxide absorption capacity of the reforming agent is gradually decreased, the decrease is not so abrupt that the use thereof becomes difficult through one repetition, and the reforming agent can endure several repetitions. Accordingly, activation processing of the circulated reforming agent may be performed every several repetitions. That is, the carbon dioxide absorption activity of the reforming agent can be maintained at a certain level or more by branching one $n^{th}$ of the reforming agent after the regeneration, introducing the branched reforming agent into the reforming agent activation device 15, and reacting the introduced reforming agent with the steam 5 to form the slaked lime having high activity. A branching ratio of the reforming agent after the regeneration may be set such that a level of necessary absorption activity can be maintained.

In addition, as described above, in order to solve the problem in which the calorific value is reduced as the slaked lime absorbs the carbon dioxide in the reformer 1, a dry gas 21 of 673 K or more formed of air or nitrogen from a dry gas supply device 20 is supplied into the reforming agent activation device 15, the slaked lime obtained by reaction of the steam 5 with the quick lime in the reforming agent activation device 15 is dehydrated with the dry gas 21 to return the slaked lime to the quick lime, and the quick lime is supplied to the reformer 1. Accordingly, insufficiency of the heat of reaction in the reformer 1 can be solved. As is described above, the temperature of the reformer 1 can be adjusted by selecting an optimum point to adjust a branching fraction of the reforming agent after the regeneration introduced into the reforming agent activation device 15.

When the gasification furnace 2 uses steam as a gasifying agent, while the reforming reaction in the reformer 1 can progress with only the steam remaining in the produced gas 3, since the reaction cannot easily progress when the steam concentration (the partial pressure) is decreased by the reforming reaction, the steam 5 may be added and supplied according to the necessity. Here, when the gasification furnace 2 uses the steam generated by the heat exchanger or the like configured to recover the exhaust heat as the gasifying agent and the steam in the gasification furnace 2 has remaining power, this steam may be used in the reformer 1. However, the steam for the reforming reaction should be overheated. Accordingly, in consideration of the case in which the steam of the gasification furnace 2 has no remaining power, the steam source, the superheater, and so on, may be independently provided.

Next, an operation of the example will be described.

The reason for using the quick lime (CaO) as the reforming agent is not only that the quick lime can be used as a catalyst but that the heat is generated when CaO absorbs $CO_2$ in the produced gas 3 to become $CaCO_3$ and the heat is used as energy for the reforming reaction, which is an endothermic reaction. The main reaction in the reformer 1 is as follows. That is, heat of reaction $\Delta T_1$ of Formula (1) and heat of reaction $\Delta T_2$ of Formula (2) are used in the reforming reaction of Formula (3).

Shift Reaction

$CO+H_2O \leftrightarrow CO_2+H_2+\Delta T_1$,    (1)

$CO_2$ Absorption Reaction

$CaO+CO_2 \leftrightarrow CaCO_3+\Delta T_2$,    (2)

Reforming Reaction

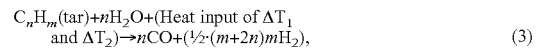

$C_nH_m(tar)+nH_2O+(\text{Heat input of } \Delta T_1 \text{ and } \Delta T_2) \rightarrow nCO+(\frac{1}{2} \cdot (m+2n)mH_2)$,    (3)

While the reforming reaction progresses even at 873 K (600° C.), a time consumed while the produced gas 3 passes through the reformer 1 is from about several seconds to over ten seconds according to the scale of the device, and in order to substantially completely decompose the tar contained in the produced gas 3 into CO or $H_2$ during this time, it is preferable to set the temperature to about 923 K (650° C.) or more, and if possible, 973 K (700° C.) or more. However, since the calorific value when CaO absorbs $CO_2$ is limited, the too high temperature is not particularly preferable. The linear velocity when the produced gas 3 passes through the reformer 1 is set to be smaller within a fluidal range, and if possible, the thickness (the layer height) of the fluidized bed is set to be larger. Since the layer height exerts an influence on the pressure loss of the reformer 1, optimization of both the gas flow velocity, which is a factor of the reaction rate, and the temperature and the residence time of the produced gas 3 (the contact time between the produced gas and the reforming agent), and the layer height of the fluidized bed is ultimately considered.

As described above, as the reforming is performed using the quick lime (CaO) as the catalyst and the reforming reaction of the tar is increased using heat generated when the quick lime absorbs the carbon dioxide in the produced gas to generate the calcium carbonate, the reformation of the produced gas can be performed at a lower temperature than that of the conventional reformation device. Accordingly, as supply of oxygen or the like for increasing the temperature is reduced or consumption of the produced gas is suppressed without supply of the oxygen or the like, a decrease in calorific value of the produced gas can be suppressed. In addition, as the tar can also be decomposed by a gas containing CO and $H_2$ as main components, a decrease in calorific value of the produced gas can be suppressed.

The calcium carbonate ($CaCO_3$) continuously discharged from the reformer 1 and transported to the reforming agent regenerator 8 is burnt in the reforming agent regenerator 8 at a temperature of more than 1073 K (800° C.) and less than 1273 K (1000° C.) to return the calcium carbonate to the quick lime (CaO), and the quick lime is transported to the reformer 1 again. A main reaction in the reforming agent regenerator 8 is as follows.

Burning Reaction=Endothermic Reaction (Burning of Reforming Agent)

$$CaCO_3 \rightarrow CaO+CO_2, \qquad (4)$$

Combustion Reaction of Fuel=Exothermic Reaction (Hydrogen as Fuel is Omitted)

$$C(\text{as Fuel})+O_2 \rightarrow CO_2, \qquad (5)$$

Since a large amount of heat absorption accompanies regeneration of the quick lime in the reforming agent regenerator 8, regeneration of the quick lime is performed by supply of the auxiliary fuel 14 configured to maintain the inside of the reforming agent regenerator 8 at a high temperature and supply of the air 12 or the oxygen 10 for combustion of the fuel, and the calorific value needed to discharge $CO_2$ from $CaCO_3$ is stored in CaO as chemical energy, the chemical energy is served as energy upon the reforming reaction in the reformer 1.

It is preferable to use a gas or liquid fuel that gasifies easily, not containing ash content (mineral), as the auxiliary fuel 14 used upon the regeneration. Use of the fuel containing the ash content may also be possible by periodically exchanging the reforming agent with a new one or occasionally exchanging some of the reforming agent with a new one.

When the quick lime (CaO), which is the reforming agent, is repeatedly used, the absorption activity of $CO_2$ is decreased. As a method of recovering the absorption characteristics of $CO_2$, some of the circulated quick lime is extracted from the reforming agent regenerator 8, and new quick lime of the same amount as the extracted quick lime is supplied into the reforming agent regenerator 8 as an introduction reforming agent 16. However, since it is confirmed that the activity of the quick lime is decreased by repeating the regeneration several times and the quick lime after use which is wasted simultaneously with the supply of the new quick lime become a large amount, it may not be established as a process.

In addition, it is known that when the quick lime having decreased activity is reacted with the steam 5 to convert CaO into the slaked lime ($Ca(OH)_2$) once, and then CaO is dehydrated through re-heating by supply of the dry gas 21, the activity of CaO is recovered to some extent. Here, in the present embodiment, the quick lime having the decreased activity from the reforming agent regenerator 8 is introduced into the reforming agent activation device 15 and is activated, and the activated CaO is supplied into the reformer 1. Accordingly, CaO, which is the reforming agent, can be used for a long time.

The following reaction formula (6) shows the reaction in the reforming agent activation device 15. The quick lime discharged from the reforming agent regenerator 8 is reacted with the steam to become the slaked lime, and at the same time, heat of reaction $\Delta T_3$ is generated.

Hydration Reaction of Quick Lime $$CaO+H_2O \leftarrow \rightarrow Ca(OH)_2+\Delta T_3, \qquad (6)$$

While the reaction of Reaction Formula (6) is varied by a steam partial pressure (a value obtained by multiplying the pressure upon the reaction and the steam concentration in the reaction gas), the reaction progresses rightward at the low temperature and the reaction progresses leftward at the high temperature with respect to about 773 K (500° C.) upon the steam of 100%. Accordingly, a temperature substantially lower than 773 K is selected as the temperature in the reforming agent activation device 15. That is, the temperature in the reforming agent activation device 15 is set to a temperature that does not reach 773 K even when the temperature is increased by the heat of reaction $\Delta T_3$ of Reaction Formula (6).

Meanwhile, while the reforming agent that becomes the slaked lime by Reaction Formula (6) in the reforming agent activation device 15 is supplied into the reformer 1, as described above, the reformer 1 is used at a temperature of 873 K or more, which is under the temperature condition in which the reaction of Reaction Formula (6) progresses leftward. That is, the slaked lime supplied into the reformer 1 is rapidly changed from the slaked lime ($Ca(OH)_2$) of the right side to the CaO of the left side in Reaction Formula (6), and at the same time, heat corresponding to the heat of reaction $\Delta T_3$ is absorbed.

In the reformer 1, while the heat of $\Delta T_1$ and $\Delta T_2$ is generated by Reaction Formula (1) and Reaction Formula (2) as described above to obtain the heat needed for the reformation of the tar, as the reaction in which the slaked lime returns to the quick lime as described above simultaneously occurs therewith, heat of $\Delta T_3$ for progressing Reaction Formula (6) leftward is subtracted from the heat of $\Delta T_1+\Delta T_2$ to be used for the reformation of the tar, and thus heat needed for the reformation of the tar becomes insufficient.

Fortunately, since a ratio of the reforming agent supplied into the reforming agent activation device 15 among the reforming agent after the regeneration discharged from the reforming agent regenerator 8 is small and the most part of the reforming agent supplied into the reformer 1 is the quick lime (CaO), the heat needed when Reaction Formula (6) progresses leftward is smaller than the heat obtained by Reaction Formula (1) and Reaction Formula (2), and the influence on the temperature of the reformer 1 is reduced.

In addition, in the present invention, as the characteristics in which CaO absorbs $CO_2$ upon the reforming reaction in the reformer 1 are used, absorption of $CO_2$ becomes possible. CO is contained in the produced gas 3, and $CO_2$ is generated when the produced gas 3 is supplied into the reformer 1. In order to actively absorb $CO_2$, together with the produced gas 3, the steam 5 is supplied into the reformer 1 such that the steam concentration becomes about 50% in a gas composition after the mixing. When $CO_2$ is actively absorbed, the steam 5 is supplied into the reformer 1 such that the steam concentration becomes about 50%. However, when only the tar reformation is performed in the reformer 1, the steam 5 may be supplied such that the steam concentration becomes less than 50%. The reaction of absorbing $CO_2$ in the produced gas 3 progresses in the reformer 1. As a result, a balance of the composition of $H_2$, CO, $CO_2$ and $H_2O$ collapses, a shift reaction of Formula (1) progresses, and CO, which is not inherently absorbed, is also resultantly absorbed such that only the hydrocarbon, which is not involved in the reaction with $H_2$, remains.

Further, the reforming agent regenerator 8 may be constituted by a closed system. That is, as a system of recycling the regenerated off-gas constitutes and oxygen (pure oxygen) from the oxygen manufacturing device 9 is used for an oxidation gas needed to combust the auxiliary fuel 14 for the regeneration, the regenerated off-gas may be $CO_2$ gas having a high purity of about 100%, and accordingly, the system can be changed into a CCS system for compressing and storing the regenerated off-gas as it is.

It is known that, while the reaction of burning $CaCO_3$ into CaO sufficiently progresses at 1073 to 1173 K (800 to 900° C.) in the air, the temperature needed for the reaction is increased in the gas atmosphere having high $CO_2$ concentration. This is caused by an influence on the $CO_2$ partial pressure in the gas in the reforming agent regenerator 8. However, since recovery of $CO_2$ becomes difficult when nitrogen or the like is used to decrease the $CO_2$ partial pressure, the steam 5 is alternatively added. Since the added steam can be condensed and removed when the steam is somewhat cooled during the process of compressing the off-gas, the influence on the $CO_2$ recovery can be reduced.

Figure 2:
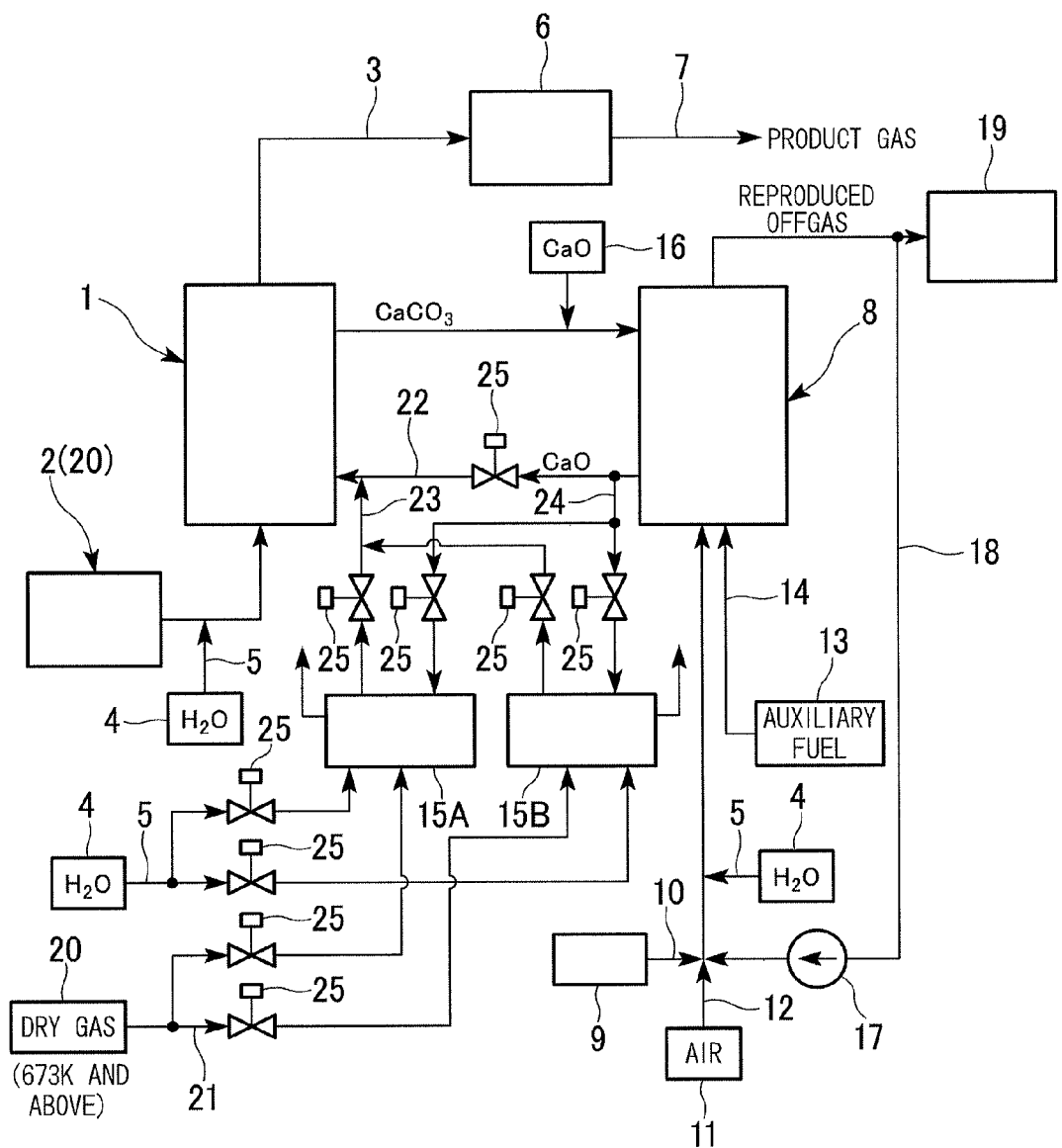
FIG. 2 is a block diagram when a batch processing method is employed, in the case in which a reforming agent after reproduction is activation-processed.

FIG. 2 is a block diagram when a batch processing method is employed, in the case in which a reforming agent after reproduction is activation-processed. That is, in the case of FIG. 2, two reforming agent activation devices 15A and 15B are connected to a pathway 22 configured to supply CaO burnt by the reforming agent regenerator 8 into the reformer 1 via two flow paths 23 and 24. In FIG. 2, reference numeral 25 designates a valve configured to perform switching to the reforming agent activation devices 15A and 15B.

In general, while the reforming agent (CaO) after regeneration from the reforming agent regenerator 8 is directly supplied into the reformer 1 by the pathway 22, when it is determined that activation of the CaO is needed, all of the CaO after regeneration discharged from the reforming agent regenerator 8 is supplied and received into the one reforming agent activation device 15A through the flow path 23 by switching the valve 25, and during that time, the reforming agent (CaO) accumulated through the activation processing in the other reforming agent activation device 15B is supplied into the reformer 1, thereby maintaining a function of the reformer 1. A predetermined amount of CaO is accumulated in the reforming agent activation device 15A into which the CaO is received, and at the same time, the reforming agent activation device 15B from which the reforming agent is supplied into the reformer 1 becomes empty. Accordingly, the steam is supplied into the reforming agent activation device 15A, in which the predetermined amount of CaO is accumulated, the steam is reacted with the CaO to become the slaked lime to attenuate the crystalline structure, the dry gas 21 is supplied so that the slaked lime returns to the CaO, and thus the absorption activity of $CO_2$ is recovered.

In addition, when it is determined that the activation of CaO is needed again, the valve 25 is switched such that all of the CaO after regeneration is received in the other reforming agent activation device 15B through the flow path 24, and the reforming agent (CaO) accumulated in the reforming agent activation device 15A through the activation processing is supplied into the reformer 1.

It is known that the slaked lime is easily changed into the quick lime at 673 K (400° C.) to 823 K (550° C.) under a dry condition lower than the atmospheric pressure, and refinement of the crystal does not occur at such a temperature. For this reason, high carbon dioxide absorption activity after the activation processing is maintained by the heating dehydration.

The following Table shows a switching pattern of an operation according to the batch processing method, and the operation is performed according to the following steps.

TABLE 1

| Flow of Reforming agent | | 1 Cycle | | | | | | |
|---|---|---|---|---|---|---|---|---|
| | | a | b | c | d | e | f | g |
| Regenerator 8 → Reformer 1 (Directly) | | | | | | | | |
| Activation Device 15A | Supply: Regenerator 8 → Activation Device 15A Discharge: Activation Device 15A → Reformer 1 | Supply | | Activation | Dehydration | Discharge | Standby | Supply |
| Activation Device 15B | Supply: Regenerator 8 → Activation Device 15B Discharge: Activation Device 15B → Reformer 1 | Discharge | | Standby | | Supply | Activation | Dehydration | Discharge | a: Upon the normal operation, the reforming agent after regeneration regenerated and discharged from the regenerator 8 is directly supplied into the reformer 1.

b: When the activation processing of the reforming agent is needed, the valve 25 is switched at an outlet of the regenerator 8 such that all of the discharged reforming agent is supplied into the activation device 15A.

During this time, since supply of the reforming agent from the regenerator 8 to the reformer 1 is interrupted, the reforming agent accumulated after completion of the activation processing in the activation device 15B is supplied into the regenerator 8, and the operation is continued.

c: The reforming agent supplied into the activation device 15A is reacted with the steam to generate the slaked lime.

During this time, the reforming agent regenerated in the regenerator 8 is directly supplied into the reformer 1.

The activation device 15B stands by in an empty state.

d: The gas supplied into the activation device 15A is changed from the steam to the dry gas 21 of air or nitrogen, the temperature is increased to perform dehydration of the slaked lime (reverse reaction of the reaction with the steam), and processing of returning to the quick lime is performed.

During this time, the reforming agent regenerated in the regenerator 8 is directly supplied into the reformer 1.

The activation device 15B continuously stands by.

e: When the activation processing of the reforming agent is needed, the valve 25 is switched at the outlet of the regenerator 8 such that all of the discharged reforming agent is supplied into the activation device 15B.

During this time, since supply of the reforming agent from the regenerator 8 to the reformer 1 is interrupted, the reforming agent after the activation processing and dehydration processing in the activation device 15A is supplied into the reformer 1, and the operation is continued.

f: The reforming agent supplied into the activation device 15B is reacted with the steam to generate the slaked lime.

During this time, the reforming agent from the regenerator 8 is directly supplied into the reformer 1.

The activation device 15A stands by in an empty state.

g: The gas supplied into the activation device 15B is changed from the steam 5 to the dry gas 21 of air or nitrogen, the temperature is increased to perform dehydration of the slaked lime (reverse reaction of the reaction with the steam), and processing of returning to the quick lime is performed.

During this time, the reforming agent regenerated in the regenerator 8 is directly supplied into the reformer 1.

The activation device 15A continuously stands by.

The above-mentioned steps b to g serve as one cycle of the reforming agent activation processing. In the reforming agent activation processing, steps b to g are repeated, and a standby for time adjustment between the dehydration and the discharge of the activation devices 15A and 15B is also provided according to the status of a decrease in performance of the reforming agent.

The method and device for reforming a produced gas of the present invention is not limited to the above-mentioned example, but various modifications can be made without departing from the spirit of the present invention.

INDUSTRIAL APPLICABILITY

According to the present invention, it is possible to provide a method and device for reforming a produced gas that are capable of reducing tar generated by low temperature gasification by using additional relatively-small equipment.

REFERENCE SIGNS LIST

1: reformer
2: gasification furnace
3: produced gas
4: steam source
5: steam
8: reforming agent regenerator
9: oxygen manufacturing device
10: oxygen
12: air
14: auxiliary fuel
15, 15A, 15B: reforming agent activation device
20: 2-tower type gasification furnace

The invention claimed is:

1. A method of reforming a produced gas configured to reform tar contained in the produced gas from a gasification furnace, the method comprising:
generating calcium carbonate in a reformer by bringing the produced gas from the gasification furnace in contact with quick lime so that the quick lime absorbs carbon dioxide in the produced gas, performing a reforming reaction of the tar with calcium as a catalyst using reaction heat generated when the calcium carbonate is generated,
supplying the calcium carbonate in the reformer, auxiliary fuel, and air into a reforming agent regenerator to form a fluidized bed, returning the calcium carbonate to the quick lime by burning the calcium carbonate using heat by combustion of the auxiliary fuel, and supplying the quick lime into the reformer, and wherein steam is reacted with a part of the quick lime burnt by the reforming agent regenerator to obtain slaked lime having high activity, and the slaked lime is supplied into the reformer together with the quick lime burnt by the reforming agent regenerator.

2. The method of reforming the produced gas according to claim 1, wherein, in the reformer, the reforming reaction of the tar is performed using, in addition to the heat generated when the calcium carbonate is generated from the quick lime, heat generated when the carbon dioxide is generated through reaction between carbon monoxide and moisture in the produced gas.

3. The method of reforming the produced gas according to claim 1, wherein steam is reacted with the quick lime burnt by the reforming agent regenerator to obtain slaked lime having high activity, and continuously, the quick lime is obtained by heating and dehydrating the slaked lime and supplied into the reformer.

4. The method of reforming the produced gas according to claim 1, wherein oxygen is supplied, instead of air, into the reforming agent regenerator, the auxiliary fuel is combusted with the oxygen, a gas containing high concentration carbon dioxide is generated in the reforming agent regenerator by burning the calcium carbonate using heat by combustion of the auxiliary fuel, and the carbon dioxide is recovered from the generated gas.

5. The method of reforming the produced gas according to claim 4, wherein a part of a regenerated off-gas from the reforming agent regenerator is mixed with the oxygen supplied into the reforming agent regenerator.

6. The method of reforming the produced gas according to claim 5, wherein steam is further mixed with the oxygen supplied into the reforming agent regenerator.

7. The method of reforming the produced gas according to claim 6, wherein the regenerated off-gas from the reforming agent regenerator is cooled to a condensation temperature of the steam or less.

8. The method of reforming the produced gas according to claim 1, wherein the reformer introduces and reforms the produced gas from a 2-tower type gasification furnace operated at a normal pressure.

9. A device for reforming a produced gas configured to reform tar contained in the produced gas from a gasification furnace, the device comprising: a reformer configured to generate calcium carbonate by introducing the produced gas from the gasification furnace into the reformer and bringing the produced gas in contact with quick lime so that the quick lime absorbs carbon dioxide in the produced gas, and perform a reforming reaction of the tar with calcium as a catalyst using reaction heat generated when the calcium carbonate is generated; and a reforming agent regenerator configured to introduce the calcium carbonate in the reformer, auxiliary fuel, and air to form a fluidized bed, return the calcium carbonate to the quick lime by burning the calcium carbonate using heat by combustion of the auxiliary fuel, and supply the quick lime into the reformer again, and wherein steam is reacted with a part of the quick lime burnt by the reforming agent regenerator to obtain slaked lime having high activity, and the slaked lime is supplied into the reformer together with the quick lime burnt by the reforming agent regenerator.

10. The device for reforming the produced gas according to claim 9, further comprising a reforming agent activation device configured to introduce the quick lime burnt by the reforming agent regenerator, obtain slaked lime having high activity by reaction of steam with the quick lime, and continuously, obtain the quick lime by heating and dehydrating the slaked lime, and supply the quick lime into the reformer.

11. The device for reforming the produced gas according to claim 9, further comprising an oxygen supply device configured to supply oxygen, instead of air, into the reforming agent regenerator, wherein the carbon dioxide is recovered from a produced gas containing high concentration carbon dioxide which is obtained by burning calcium carbonate with the oxygen.

12. The device for reforming the produced gas according to claim 11, wherein a part of a regenerated off-gas from the reforming agent regenerator is mixed with the oxygen supplied into the reforming agent regenerator from the oxygen supply device.

13. The device for reforming the produced gas according to claim 12, wherein steam is further mixed with the oxygen supplied into the reforming agent regenerator.

14. The device for reforming the produced gas according to claim 13, wherein the regenerated off-gas from the reforming agent regenerator is cooled to a condensation temperature of the steam or less.

15. The device for reforming the produced gas according to claim 9, wherein the reformer is connected to a 2-tower type gasification furnace operated at a normal pressure.

* * * * *